(12) United States Patent
Luo

(10) Patent No.: US 11,941,976 B2
(45) Date of Patent: Mar. 26, 2024

(54) SYSTEM AND METHOD FOR SHARING DATA COLLECTED FROM THE STREET SENSORS

(71) Applicant: Pony AI Inc., Grand Cayman (KY)

(72) Inventor: George Chu Luo, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 342 days.

(21) Appl. No.: 16/522,568

(22) Filed: Jul. 25, 2019

(65) Prior Publication Data

US 2021/0026360 A1    Jan. 28, 2021

(51) Int. Cl.
| | |
|---|---|
| *G08G 1/01* | (2006.01) |
| *G05D 1/00* | (2006.01) |
| *G05D 1/02* | (2020.01) |
| *G06N 20/00* | (2019.01) |
| *G06V 10/20* | (2022.01) |
| *G06V 20/54* | (2022.01) |
| *G06V 20/58* | (2022.01) |

(52) U.S. Cl.
CPC ......... *G08G 1/0116* (2013.01); *G05D 1/0088* (2013.01); *G05D 1/0214* (2013.01); *G06N 20/00* (2019.01); *G06V 10/255* (2022.01); *G06V 20/54* (2022.01); *G06V 20/58* (2022.01); *G08G 1/0125* (2013.01); *G08G 1/0145* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,102,496 B1 | 9/2006 | Ernst, Jr. et al. | |
| 9,269,202 B2 | 2/2016 | Phelan et al. | |
| 10,242,513 B1 | 3/2019 | Fields et al. | |
| 10,564,638 B1* | 2/2020 | Lockwood | G05D 1/0044 |
| 2005/0065711 A1* | 3/2005 | Dahlgren | G08G 1/01 701/117 |
| 2013/0124006 A1 | 5/2013 | Anantha et al. | |
| 2013/0201051 A1* | 8/2013 | Kreter | G01S 13/91 342/52 |
| 2017/0039850 A1* | 2/2017 | Vanden Berg | G08G 1/096725 |
| 2017/0148350 A1* | 5/2017 | Stankoulov | B60W 50/14 |

(Continued)

*Primary Examiner* — James M Mcpherson
*Assistant Examiner* — Bakari Underwood
(74) *Attorney, Agent, or Firm* — Sheppard Mullin Richter & Hampton LLP; Xin Xie

(57) ABSTRACT

An environmental safety system may comprise a plurality of first sensors each located at a predetermined physical location of a traffic intersection and with a predetermined orientation. The system may have a memory storing executable instructions. The system may have one or more processors in communication with the plurality of first sensors and the memory. The one or more processors may be programmed by the executable instructions. The system may receive first sensor data captured at a time point and by the plurality of first sensors. The system may determine values of one or more parameters of an object of interest within a threshold distance of the traffic intersection using the first sensor data. The system may generate an information object comprising the values of the one or more parameters of the object of interest, the time point, and a signature of the information object. The system may transmit, via a communication network, the information object.

20 Claims, 9 Drawing Sheets

(56) References Cited

U.S. PATENT DOCUMENTS

| | | | |
|---|---|---|---|
| 2017/0197643 A1* | 7/2017 | Gariepy | B61L 15/0072 |
| 2019/0221116 A1* | 7/2019 | Powch | G08G 1/0112 |
| 2019/0318267 A1* | 10/2019 | Zhang | G06F 30/20 |
| 2019/0333232 A1* | 10/2019 | Vallespi-Gonzalez | G06N 5/022 |
| 2019/0385446 A1* | 12/2019 | Lepp | G08G 1/0116 |
| 2020/0207339 A1* | 7/2020 | Neil | G05D 1/0212 |
| 2020/0313848 A1* | 10/2020 | Troia | H04L 9/006 |
| 2020/0342620 A1* | 10/2020 | Zagajac | G06T 7/73 |
| 2020/0388156 A1* | 12/2020 | Aoude | G08G 1/0116 |

* cited by examiner

SYSTEM AND METHOD FOR SHARING DATA COLLECTED FROM THE STREET SENSORS

TECHNICAL FIELD

The present disclosure relates generally to sharing data collected from street sensors using street sensors, specifically at traffic intersections. More particularly, the present disclosure relates to environmental safety systems and methods for collecting, integrating and sharing data from the streets.

BACKGROUND

Under conventional sensing systems and methods, an autonomous vehicle may use sensor data collected from its sensors in the vehicle to identify objects in its surroundings and determine its navigation based on the sensor data generated based on the vehicle sensors. Such determination of autonomous vehicle navigation may be limited by the sensing capabilities of the vehicle sensors. Sensor data from the vehicle sensors may not provide comprehensive information regarding objects in the environment of the vehicle. For example, the vehicle sensor may not have the capability to detect certain objects in the area of traffic intersections or may be limited from detecting certain objects due to environmental configurations. For example, a vehicle approaching a traffic intersection may include a camera and an object at the traffic intersection may not be detected by the camera due to the object not being within the field of view of the camera. Furthermore, a street sensor on street, particularly at traffic intersections, may not provide an update of road conditions or traffic status of the traffic intersection. The conventional street sensors may not be able to integrate its own data from street with the sensor data fused from vehicles approaching the traffic intersection. As a result, the street sensors may not be able to share a complete data information about traffic information and/or safety information. These shortfalls are addressed by the present disclosure, which collects data information from street sensors and provides a complete safety information of traffic intersections to authorized data receivers, and allows the data receivers to execute actions based on the safety information. The present disclosure also provides the vehicle with greater capability to detect certain objects, particularly nearby traffic intersections, and allows the vehicle to efficiently execute an optimized driving action.

SUMMARY

Described herein are systems and methods for sharing data collected from an environmental safety system. Various embodiments of the present disclosure provide an environmental safety system. The environmental safety system may comprise a plurality of first sensors. The plurality of first sensors may be located at a predetermined physical location of a traffic intersection and with a predetermined orientation. The environmental safety system may comprise a memory storing executable instructions. The environmental safety system may comprise one or more processors in communication with the plurality of first sensors and the memory. The one or more processors may be programmed by the executable instructions to perform receiving first sensor data captured at a time point and by the plurality of first sensors. The one or more processors may be programmed to perform determining values of one or more parameters of an object of interest within a threshold distance of the traffic intersection using the first sensor data. The one or more processors may be programmed to perform generating an information object comprising the values of the one or more parameters of the object of interest, the time point, and a signature of the information object. The one or more processors may be programmed to perform transmitting the information object via a communication network.

In some embodiments, the transmitting is responsive to receiving, via the communication network, a request for safety information related to the traffic intersection. In some embodiments, the request for the safety information is received after an occurrence of a traffic accident at the traffic intersection. In some embodiments, the request for the safety information is received from a vehicle approaching the traffic intersection.

In some embodiments, an autonomous vehicle sensor data processing system of the vehicle may be configured to perform receiving second sensor data captured by a plurality of second sensors mounted on the vehicle. The autonomous vehicle sensor data processing system of the vehicle may be configured to perform determining a driving action of the vehicle using the values of the one or more parameters of the object of interest, the time point, and the second sensor data.

In some embodiments, the one or more processors may be further programmed by the executable instructions to perform: updating a usage record of an account associated with the vehicle.

In some embodiments, the receiving may comprise receiving first sensor data captured at a plurality of time points and by the plurality of first sensors. In some embodiments, the determining may comprise determining values of the one or more parameters of the object of interest at each of the plurality of time points using the first sensor data. In some embodiments, the transmitting may comprise transmitting, via the communication network, the information object comprising the values of the one or more parameters of the object of interest for the latest time point that have been determined. In some embodiments, the receiving may comprise receiving a plurality of requests for safety information related to the traffic intersection. Each of the plurality of requests may comprise a request time point. In some embodiments, the transmitting may comprise transmitting, via the communication network, the information object comprising a time point that may match or may be within a threshold time period of, the requested time point.

In some embodiments, the transmitting may comprise: broadcasting, via the communication network, the information object.

In some embodiments, at least one sensor of the plurality of first sensors may be mounted above and close to the center of the traffic intersection. In some embodiments, sensors of the plurality of first sensors with different predetermined orientations may be mounted above and close to the center of the traffic intersection. In some embodiments, the sensors with different predetermined orientations mounted above and close to the center of the traffic intersection may be within a physical housing. In some embodiments, sensors of the plurality of first sensors may be located at segments of the traffic intersection. The sensors at different segments of the traffic intersection may have different predetermined orientations.

In some embodiments, the object of interest may not be within the line of sight of a sensor of the plurality of second sensors mounted on the vehicle. In some embodiments, the second sensor data may comprise no sensor data related to the object of interest. In some embodiments, a first sensor of the plurality of first sensors and a second sensor of the second plurality of sensors have different fields of view.

In some embodiments, the driving action determined may be different from a driving action of the vehicle determined using the second sensor data, not the values of the one or more parameters of the object of interest determined. In some embodiments, determining the driving action may require fewer computational operations than determining a driving action of the vehicle using the second sensor data, not the values of the one or more parameters of the object of interest determined. In some embodiments, the processor may be capable of performing more computational operations within a period of time than the autonomous vehicle sensor data processing system.

In some embodiments, the one or more parameters of the object of interest may comprise an identity of the object of interest, a size of the object of interest, a position of the object of interest, a path of the object of interest, and a speed of the object of interest. In some embodiments, the values of the one or more parameters of the object of interest may comprise the position of the object of interest with respect to the traffic intersection, with respect to an absolute reference frame, or with respect to the vehicle.

In some embodiments, determining the values of the one or more parameters of the object of interest may comprise determining the values of the one or more parameters of the object of interest using a first machine learning model, and/or wherein determining the driving action may comprise determining the driving action using a second machine learning model.

Various embodiments of the present disclosure provide a method for street safety under control of a processor. The method may comprise receiving first sensor data captured at a time point and by a plurality of first sensors. The plurality of first sensors may be located at a predetermined physical location of a traffic intersection and with a predetermined orientation. The method may comprise determining values of one or more parameters of an object of interest within a threshold distance of the traffic intersection using the first sensor data. The method may comprise generating an information object comprising the values of the one or more parameters of the object of interest, the time point, and a signature of the information object. The method may comprise, transmitting, via a communication network, the information object.

In some embodiments, the transmitting is responsive to receiving, via the communication network, a request for safety information related to the traffic intersection.

In some embodiments, an autonomous vehicle sensor data processing system of the vehicle may be configured to perform receiving second sensor data captured by a plurality of second sensors mounted on the vehicle. In some embodiments, the autonomous vehicle sensor data processing system of the vehicle may be configured to perform determining a driving action of the vehicle using the values of the one or more parameters of the object of interest, the time point, and the second sensor data.

The method of determining a driving action of a vehicle may comprise receiving, under control of a processor, first sensor data captured by a plurality of first sensors each located at a predetermined physical location of a traffic intersection and with a predetermined orientation. The method of determining a driving action of a vehicle may comprise determining values of one or more parameters of an object of interest within a threshold distance of the traffic interaction using the first sensor data. The method of determining a driving action of a vehicle may comprise generating an information object comprising the values of the one or more parameters of the object of interest, the time point, and a signature of the information object. The method of determining a driving action of a vehicle may comprise transmitting, via a communication network, the information object to a vehicle approaching the traffic intersection. The method of determining a driving action of a vehicle may comprise an autonomous vehicle sensor data processing system of the vehicle. The autonomous vehicle sensor data processing system may be configured to perform verifying the integrity of the information object using the signature of the information object. The autonomous vehicle sensor data processing system may be configured to perform receiving second sensor data captured by a plurality of second sensors mounted on the vehicle. The autonomous vehicle sensor data processing system may be configured to perform determining a driving action of the vehicle using the values of the one or more parameters of the object of interest, the time point, and the second sensor data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
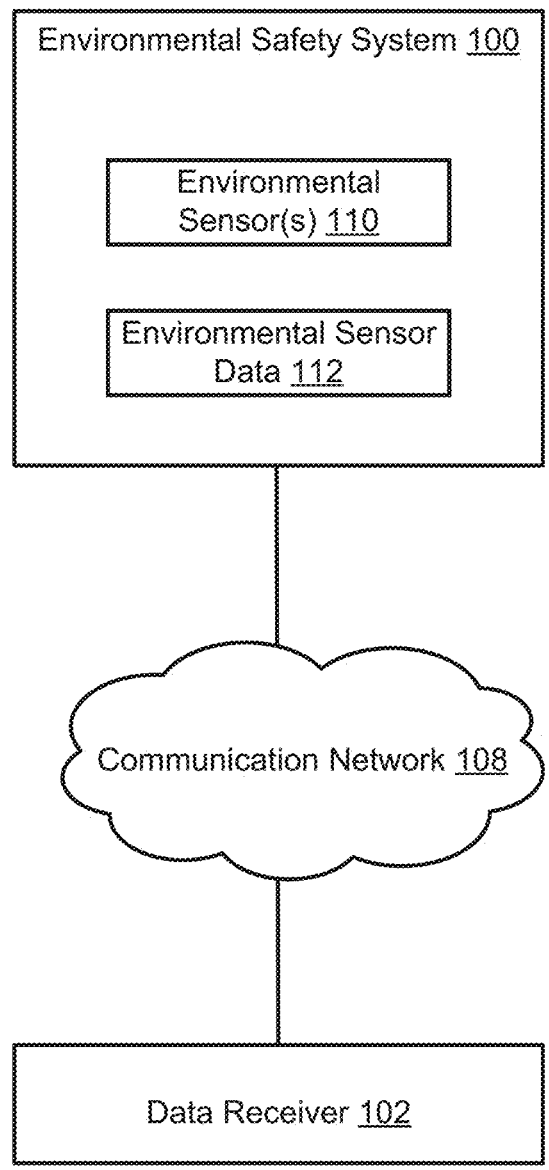
FIG. 1 illustrates a diagram of an example system of an environmental safety system for sharing data collected from streets, in accordance with some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle, a driverless vehicle, etc.) can have myriad sensors onboard the vehicle. The myriad sensors can include light detection and ranging sensors (or Lidars), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, Lidars can be utilized to detect and identify objects (e.g., other vehicles, road signs, pedestrians, buildings, etc.) in a surrounding. Lidars can also be utilized to determine relative distances of the objects in the surrounding. For another example, radars can be utilized to aid with collision avoidance, adaptive cruise control, blind side detection, assisted parking, etc. For yet another example, cameras can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

With a variety of sensors, either equipped on a vehicle or mounted on streets, it is important to have a system or a hub that is capable of collecting all the information from various sensors including from street sensors and vehicle sensors, and sharing data collected from different sources to authorized data receivers (e.g. vehicles, or authorized authorities and/or objects) approaching the street. In various implementations, an environmental safety system may collect a set of data from different vehicle sensors and/or street sensors, particularly sensors mounted above or close to traffic intersections. The set of sensor data may include different sensor data generated based on sensors of the environmental safety system at a plurality of time points. Sensor data generated based on the environmental safety system may characterize positions of objects in an environment of streets. Values of one or more parameters of the objects within a threshold distance of the streets or the traffic intersection may be determined based on the set of sensor data, a position of the vehicle, and a direction of the vehicle. The values of the one or more parameters of the objects may characterize positions of the objects with respect to the vehicle approaching the street, particularly at the traffic intersection. The environmental safety system may process and generate an information object comprising the values of the one or more parameters of the interest and the time point. The information object may refer to a status of road condition, a status of a static object on the street, and/or a car accident update. The environmental safety system may transmit and share the information object via a communication network to an authorized sensor data receiver. The sensor data receiver may include vehicles approaching to the traffic intersection, governmental authorities, or authorized devices. The environmental safety system may also collect data generated based on sensors of a first vehicle approaching the traffic intersection. The environmental safety system may integrate the information object and the first vehicle sensor data, and transmit the redirected safety information to a second vehicle approaching the traffic intersection.

The sensors of the environmental safety system may include sensors of the same type or sensors of different types. For example, the environmental safety system may include a first sensor and the vehicle may include a second sensor. The first sensor may be of a first sensor type and the second sensor may be of a second sensor type different from the first sensor type. As another example, capabilities of the first sensor and the second sensor may be different.

Different sensor data may characterize positions of different objects. For example, first sensor data generated based on the environmental safety system may characterize a position of an object based on the object being located in the environment of the first sensor. Second sensor data generated based on the second sensor may not characterize the position of the object based on the object not being located in the environment of the second sensor.

Different sensor data may characterize positions of objects differently. For example, the first sensor data may characterize an absolute position of an object in an environment of the first sensor, and the second sensor data may characterize a relative position of the object in an environment of the second sensor with respect to the second sensor and an absolute position of the second sensor. Different sensor data may also characterize movement of the object. For example, the first sensor data may characterize a movement of an object. A current position of the object may be estimated based on the absolute position of the object and the movement of the object. As another example, the second sensor data may characterize a movement of an object with respect to the second sensor. A current position of the object may be estimated based on the relative position of the object with respect to the second sensor, the absolute position of the second sensor, and the movement of the object.

Different sensor data within the set of sensor data may be arranged according to different data formats. For example, the first sensor data may be arranged according to a first data format and the second sensor data may be arranged according to a second data format different from the first data format. Obtaining the first sensor data and the second sensor data may include arranging the first sensor data and the second sensor data according to a standard data format.

Values of one or more parameters of an object for the vehicle may be determined further based on a movement of the vehicle. That is, both the position and the movement of the vehicle may be used to determine the values of the one or more parameters of the object for the vehicle.

One or more changes to a terrain in a location may be determined based on the set of sensor data. For example, a change to a road in a location covered by the set of sensor data may be determined based on the set of sensor data, where the set of sensor data includes sensor data generated at different times. A map for the location may be modified based on the change(s) to the terrain.

The approaches disclosed herein enables provision of vehicle navigation using an environmental safety system. Navigation information of a traffic intersection may be provided to a vehicle based on sensor data generated by one or more sensors external to the vehicle. For example, sensor data generated by sensors from a vehicle in an environment and/or sensor data generated by fixed sensors mounted above and close to traffic intersections may be aggregated to provide vehicle navigation for the vehicle approaching the traffic intersection. That is, the vehicle in the traffic intersection may benefit from the sensor data generated by sensor(s) of other devices (e.g. fixed sensors mounted above and close to the traffic intersection).

While the disclosure is described herein with respect to providing navigation for vehicles using an environmental safety system, this is merely for illustrative purposes and is not meant to be limiting. The approach disclosed herein may be used to provide navigation for a variety of vehicles. A vehicle may refer to a thing used for transportation. A vehicle may travel on land, on water, under the water, and/or in the air. For example, a vehicle may refer to an automobile, a train, a boat, a ship, a submarine, an airplane, a remote-controlled vehicle, or other vehicle. A vehicle may include an autonomous vehicle. An autonomous vehicle may refer to a vehicle that is capable of navigating without human input. An autonomous vehicle may be fully autonomous or partially autonomous.

The approach disclosed herein may be used to provide navigation for different types of vehicles. The approach disclosed herein may be used to provide navigation for vehicles in different types of locations (e.g., on the road, off the road, on a driving track, in the air, in the water).

FIG. 1 is a schematic diagram illustrating an example of an environment safety system 100 for sharing data collected from streets and vehicles, in particular at traffic intersections, in accordance with some embodiments. In the example illustrated in FIG. 1, the environmental safety system 100 may include one or more environmental sensors 110. The environmental sensor(s) 110 may detect a set of environmental sensor data 112. The environmental sensor(s) 110 may refer to fixed environmental sensor(s) mounted above and close to the center of traffic intersections. The environmental sensor(s) 110 may analyze the set of environmental sensor data 112 to identify objects (e.g. vehicles, pedestrians, obstacles) in traffic intersections. The environmental sensor data 112 may be generated in response to the environmental sensor(s) 110 detecting and/or measuring physical propert(ies). The environmental sensor data 112 may characterize positions/conditions of one or more objects in an environment of a traffic intersection. An environment of a traffic intersection may refer to one or more physical areas of the traffic intersection, such as one or more portions of surroundings of pedestrian crossings. Objects in the environment of the traffic intersection may refer to living things and/or non-living things in the surroundings of the environmental sensor(s) 110, such as vehicle, a structure (e.g. building, tree, mailbox, light pole, traffic light, road sign), a person (e.g. pedestrians), an animal, and/or other objects in the environment of the environmental sensor(s) 110. The objects may also refer to road conditions and/or repairs, criminal acts, accidents, and/or static objects. In some embodiments, one or more parameters of an object may include an identify of the object, a size of the object, a position of the object, a path of the object, and a speed of the object.

In some embodiments, environmental sensor data's 112 characterization of positions of one or more objects in an environment of a traffic intersection may include environmental sensor data 112 including values and/or other data that are indicative and/or descriptive of the positions of objects in the environment of the environmental sensor(s) 110. For examples, the values of one or more parameters of an object may include the position of the object, the path of the object and the speed of the object with respect to traffic intersections, with respect to an absolute reference frame, and with respect to a vehicle. As another example, the values of one or more parameters of an object may include the orientation of the object with respect to traffic intersections. In some embodiments, environmental sensor data's 112 characterization of positions of one or more objects in an environment of a traffic intersection may include environmental sensor data 112 including values and/or other data that are indicative and/or descriptive of the changes in positions of objects in the environment of the environmental sensor(s) 110. For example, the values of one or more parameters of an object may include changes in positions of the object, changes in the paths of the object, changes in orientations of the object, and changes in the speed of the object with respect to traffic intersection, with respect to an absolute reference frame, and with respect to the vehicle. In some embodiments, environmental sensor data 112 may characterize other aspects in the environment of traffic intersections. For examples, environmental sensor data 112 may characterize operating status of object(s) in the environment and/or how the object(s) are acting at traffic intersections. For example, an environmental sensor data 112 may characterize a criminal act or an accident in the environment of the environmental sensor(s) 110. As another example, an environmental sensor data 112 may characterize a road condition and/or road repair status in the environment of the environmental sensor(s) 110. As another example, the environmental sensor data 112 may provide information on how a vehicle nearby traffic intersections is operating, the status of a traffic light (e.g., green, yellow, red, flashing yellow), how a pedestrian is acting, which orientations and/or directions of a vehicle or a pedestrian, and/or other information relating to the object(s).

In some embodiments, environmental sensor data 112 may be integrated based on one or more machine learning models. For example, the environmental sensor data 112 may be integrated according to one or more parameters and/or other attributes of a machine learning model configured to determine values of one or more parameters of an object. The environmental safety system 100 may be configured to determine values of one or more parameters of an object. The values of the one or more parameters of the object may refer to an integrated value determined by the machine learning models. An example of the environmental safety system may be depicted in FIG. 3. For example, the integrated value may be determined by the machine learning model based on one or more environmental sensors 110 and transmitted to one or more data receiver(s) 102. A data receiver 102 may refer to a vehicle approaching a traffic intersection, or an account associated with the vehicle approaching the traffic intersection. A data receiver 102 may also refer to vehicles, governmental authorities or devices that are authorized to receive safety information related to the streets, particularly to traffic intersections.

The communications network 108 may represent one or more computer networks (e.g., LAN, WAN, or the like) or other transmission mediums. The communication network 108 may provide communication between the autonomous vehicle 200, authorized data receiver 102, system(s) 100, and/or other systems/engine/datastores described herein. In some embodiments, the communication network 108 includes one or more computing devices, routers, cables, buses, and/or other network topologies (e.g., mesh, and the like). In some embodiments, the communication network 108 may be wired and/or wireless. In various embodiments, the communication network 108 may include the Internet, one or more wide area networks (WANs) or local area networks (LANs), one or more networks that may be public, private, IP-based, non-IP based, and so forth.

Figure 2:
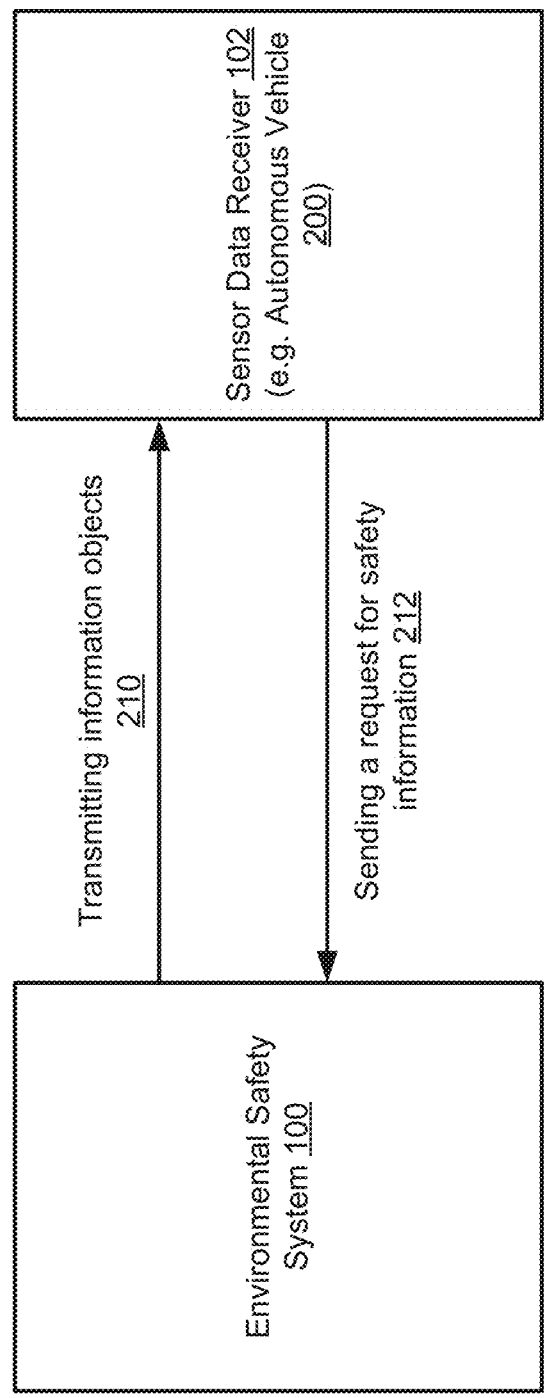
FIG. 2 illustrates a diagram of an example of the environmental safety system, in accordance with some embodiments.

FIG. 2 illustrates a schematic diagram illustrating an example of a communication between an environmental safety system 100 and a data receiver 102 via a communication network, in accordance with some embodiments. In some embodiments, the environmental safety system 100 may receive data captured at a plurality of time points and by a plurality of environmental sensors. The environmental safety system 100 may determine values of one or more parameters of an object of interest within a threshold distance of a street, in particular a traffic intersection. The environmental safety system 100 may generate an information object comprising the values of the one or more parameters of the object of interest, the time point, and/or a signature of the information object. The information object may include road conditions at traffic intersections, accidents or criminal acts happening at the traffic intersections, or static objects at or close to the traffic intersections. In some embodiments, an authorized data receiver 102 may send a request for safety information 212 related to the street conditions, particularly to the traffic intersection. The data receiver 102 may be authorized to receive the information objects when the data receiver 102 needs to understand the environmental condition of the traffic intersection. For example, when a governmental authority needs to know road conditions in a traffic intersection, a request for the safety information 212 may be received after an occurrence of a traffic accident at the traffic intersection. Under such circumstance, the environmental safety system 100 may transmit the information objects 210 (i.e. traffic condition nearby the accident, the degree of severity of the accident) to the government authority.

Figure 3:
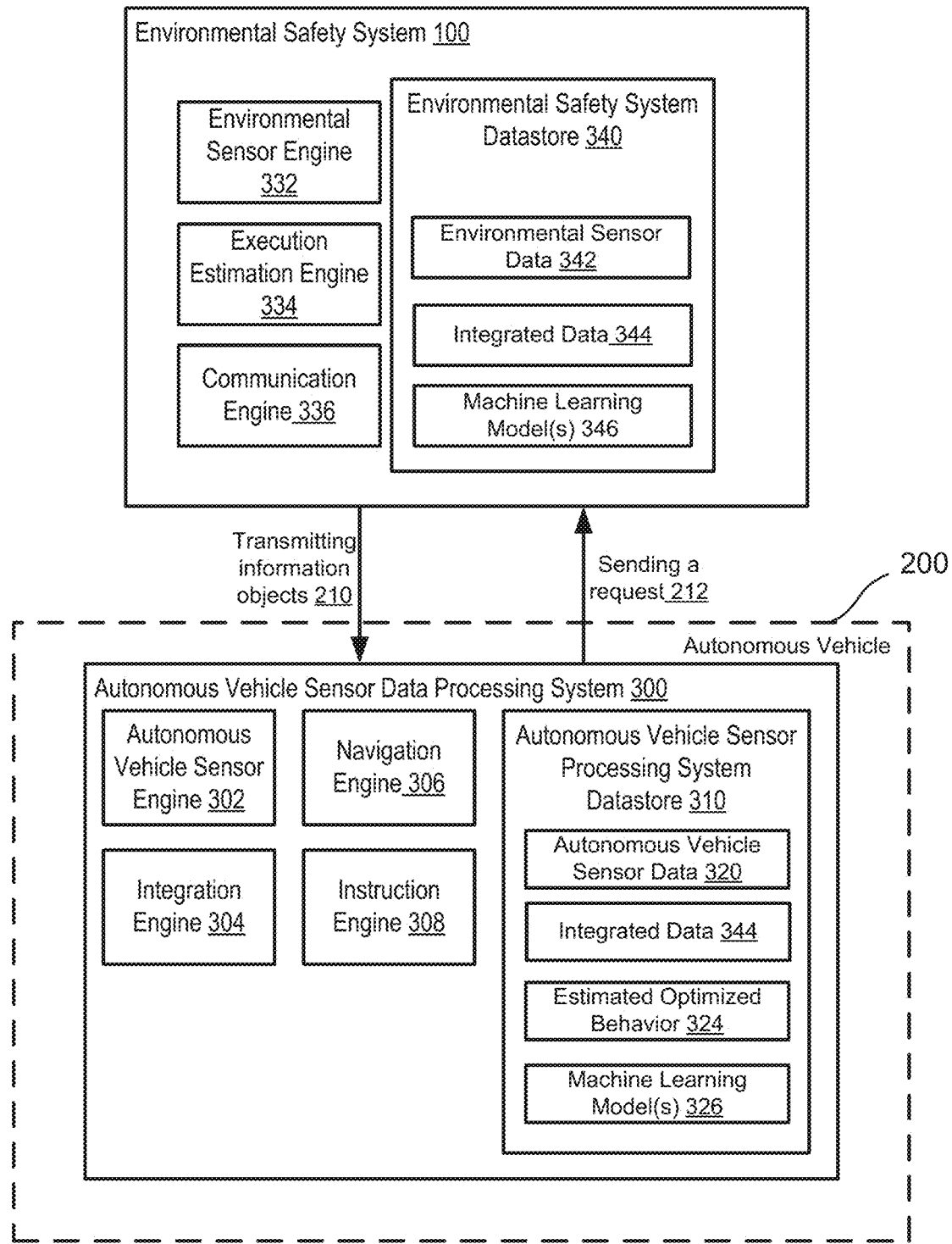
FIG. 3 illustrates a diagram of an example of the environmental safety system and an autonomous vehicle sensor data processing system, in accordance with some embodiments.

The data receiver may also refer to an autonomous vehicle 200. FIG. 3 illustrates an diagram of an environment safety system 100 for sharing data collected from streets and vehicles to an autonomous vehicle sensor processing system 300, in particular in traffic intersections, in accordance with some embodiments.

In the example illustrated in FIG. 3, the autonomous vehicle sensor data processing system 300 and the communication network may be implemented as part of the autonomous vehicle 200. The autonomous vehicle 200 may be capable of sensing its environment and/or navigating with a limited human input or without human input. The "vehicle" discussed in this disclosure typically includes a vehicle that travels on the ground (e.g. car, truck, bus), but may also include a vehicle that travels in the air (e.g., drones, helicopter, airplanes), travels on water (e.g. boat), and/or the like. The "vehicle" discussed in this disclosure may accommodate one or more users (e.g., passengers, safety drivers) therein.

In one embodiment, the autonomous vehicle 200 includes a vehicle that controls braking and/or acceleration without real time human input. In another embodiment, the autonomous vehicle 200 includes a vehicle that controls steering without real time human input based on inputs from one or more lens mount units. In another embodiment, the autonomous vehicle 200 includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control movement of a non-autonomous vehicle, such as gear shifting, steering control, braking pedal control, accel pedal control, crutch pedal control, and so on.

In some embodiments, the autonomous vehicle sensor data processing system 300 may include one or more autonomous vehicle sensor(s) and an autonomous vehicle sensor data processer. The autonomous vehicle sensor(s) may be configured to detect objects. The autonomous vehicle sensor(s) may detect objects and analyze the autonomous vehicle sensor data to identify the objects with respect to the vehicle 200. In some embodiments, the autonomous vehicle sensor processing system 300 may include cameras mounted on the autonomous vehicle 200 to capture object images (or sensor data) of regions surrounding the autonomous vehicle 200. For examples, the cameras may capture object images in front of the autonomous vehicle 200, on the sides of autonomous vehicle 200, above the autonomous vehicle 200, below the autonomous vehicle 200, and/or behind the autonomous vehicle 200.

In some embodiments, the autonomous vehicle sensor data processing system 300 may be configured to receive the values of the one or more parameters of objects from the environmental safety system 100. The vehicle sensor data processing system 300 may estimate optimized behaviors based on the autonomous vehicle sensor data and/or the values of the one or more parameters of the objects. In some embodiments, the autonomous vehicle sensor data processing system 300 may utilize machine learning models (e.g. a random forest model) to estimate optimized behaviors of an autonomous vehicle 200. For example, the autonomous vehicle sensor data processing system 300 may integrate the values of the one or more parameters of the objects and the autonomous vehicle sensor data according to a machine learning model, and the machine learning model may output one or more estimated optimized behaviors. This may allow, for example, actions to be taken based on estimated optimized behaviors instead of actual behaviors (e.g. behavior captured only by the autonomous vehicle sensor data processing system). In some embodiments, the values of the one or more parameters of the objects integrated into the autonomous vehicle sensor data processing system 300 may allow, for example, performing fewer computational operations with a period of time than using only autonomous vehicle sensor. In some embodiments, one or more processors in the environmental safety system 100 may be capable of performing more computational operations within a period of time than the autonomous vehicle sensor data processing system 300.

Figure 4:
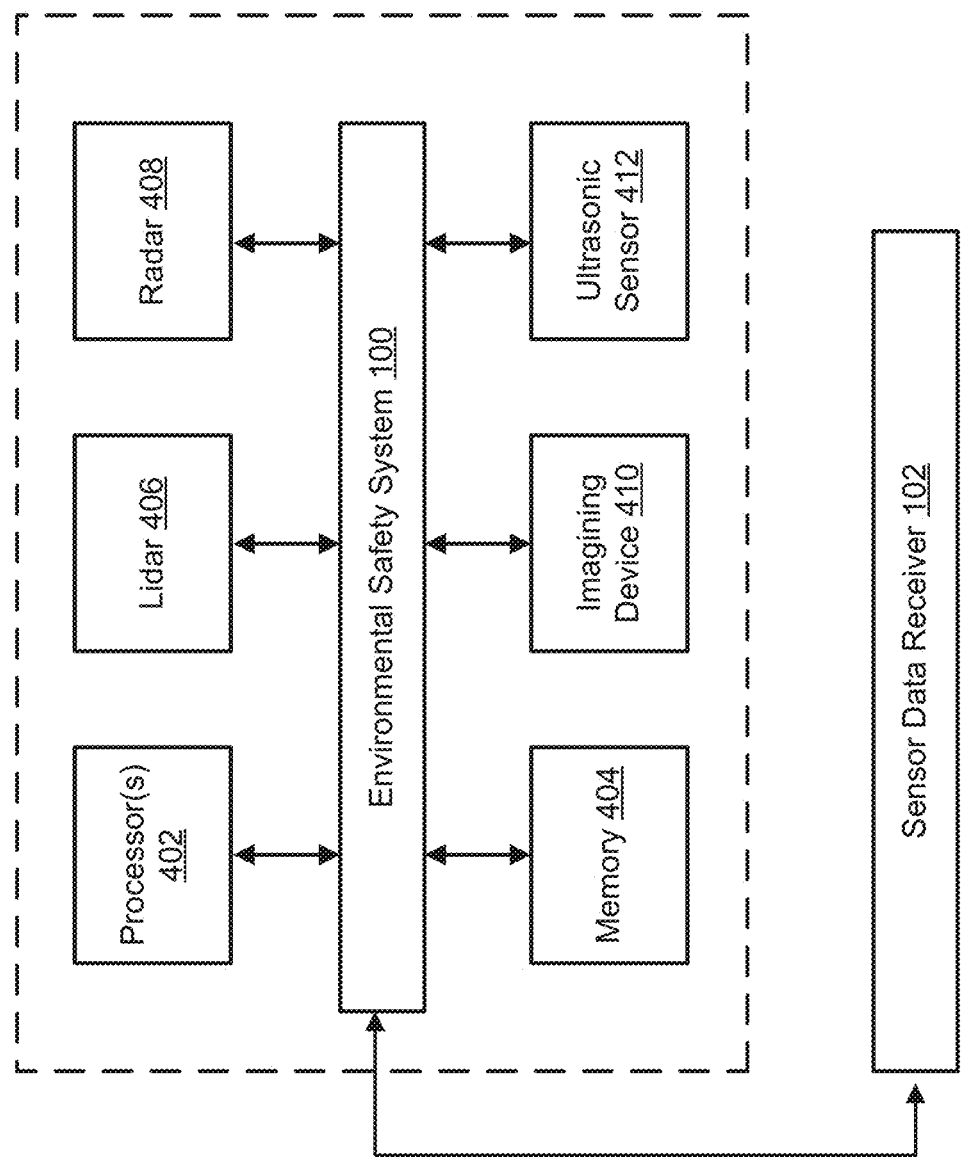
FIG. 4 illustrates an example of sensors of the environmental safety system, in accordance with some embodiments.

In the example of FIG. 3, the environmental safety system 100 includes an environmental sensor engine 332, an execution estimation engine 334, a communication engine 336, and an environmental safety system datastore 340. The environmental sensor engine 332 may be configured to obtain and/or detect environmental sensor data 342. In some embodiments, the environmental sensor engine 332 may be configured to obtain one or more sets of environmental sensor data 342. Obtaining environmental sensor data 342 may include accessing, acquiring, analyzing, determining, examining, identifying, loading, locating, opening, receiving, storing, and/or otherwise obtaining the sensor data. The environmental sensor data may be processed in the system 100. An example of environmental sensors in an environmental safety system 100 is depicted in FIG. 4. In some embodiments, the execution estimation engine 334 may be configured to integrate environmental sensor data 342 to determine information objects. For example, the execution estimation engine 334 may determine values of one or more parameters of an object based on the environmental sensor data 342. Machine learning model(s) 346 may be configured to determine executable instructions based on the integrated data 344. In some embodiments, the environmental sensor data 342 may refer to raw data that may be transmitted to the autonomous vehicle sensor data processing system 300 through the communication network.

The communication engine 336 may be configured to communicate with execution estimation engine 334 to transmit values of one or more parameters of objects to a plurality of system. In some embodiments, the communication engine 336 may be configured to encrypt and decrypt communications. The communication engine 336 may be configured to send requests to one or more systems through a communication network or a portion of a communication network. For example, the communication engine 336 may transmit values of one or more parameters of an object to a vehicle approaching a traffic intersection. Depending upon implementation-specific considerations, the communication engine 336 may send requests through a connection, all or a portion of which may be a wireless connection. Communications may be stored at least temporarily (e.g., chased and/or persistently) in the datastore 340.

In some embodiments, the sensor data processing system 300 includes a sensor engine 302, an integration engine 304, a navigation engine 306, an instruction engine 308, and an autonomous vehicle sensor processing system datastore 310. In some embodiments, a system 300 may control various sensors (e.g., cameras, radar, Lidar) of an autonomous vehicle. The system 300 may be configured to determine an estimated optimized behavior 324 based on the autonomous vehicle sensor data 320 and the values of the one or more parameters of objects (i.e. integrated data 344) transmitted from the environmental safety system 100.

The autonomous vehicle sensor engine 302 may be configured to obtain one or more sets of sensor data 320. A set of sensor data 320 obtained by the sensor engine 302 may include different sensor data 320 generated based on sensors of the same type and/or different types. A sensor engine 302 may refer to a device that detects and/or measures one or more physical properties. A sensor engine 302 may include a Lidar sensor, a radar sensor, an imaging device, an ultrasonic sensor, a vehicle telemetry sensor, an inertial measurement unit (IMU), and a global positioning system (GPS) sensor. A sensor may record, indicate, and/or otherwise respond to the detected and/or measure physical proper (ties). In some embodiments, the sensor engine 302 may be part of a vehicle, and may be mechanically and electrically. A sensor engine 302 may be positioned within a vehicle and/or positioned outside the vehicle. For example, sensor data 320 may be generated by a sensor carried by a vehicle, such as a Lidar sensor, that determines locations and/ movements of objects nearby the vehicle.

The integration engine 304 may be configured to determine integrated data 344 for a vehicle based on the sets of sensor data 320, and/or other sensor data. The integration engine 304 may integrate the integrated data 344 and the autonomous vehicle sensor data 320 according to machine learning models 326. Integrated data 344 may refer to one or more portions of the set of sensor data that has significance in determining navigation for a vehicle. The integrated data 344 may characterize positions of objects with respect to the vehicle approaching a traffic intersection. In some embodiments, the integrated data 344 may be determined based on identification/extraction of the portions(s) of the set of sensor data 320 that characterizes an environment of a traffic intersection with respect to the vehicle approaching the traffic intersection. For example, the integration engine 344 may determine the integrated data 344 for a vehicle to be the portions(s) of the set of sensor data 320 that characterizes the positions and/or movements of one or more objects with respect to the vehicle approaching a traffic intersection. One or more objects with respect to the vehicle approaching a traffic intersection may refer to other vehicles, persons, animals, traffic light that may affect the navigation or the driving action of the vehicle approaching the traffic intersection.

In some embodiments, the integration engine 304 may gather different sensor data for use based on integrated data 344 and autonomous vehicle sensor data 320. A server or a communication network 108 may gather environmental sensor data 112 generated based on an environmental sensor 110, as shown in FIG. 1, and transmit the values of the one or more parameters of an object to the integration engine 304 of the autonomous vehicle sensor data processing system 300 for the vehicle to determine its own vehicle driving action.

In some embodiments, the navigation engine 306 may be configured to determine one or more optimized driving actions of a vehicle approaching a traffic intersection based on the autonomous vehicle sensor data 320, the integrated data 344, and/or other data. A machine learning model 326 may output one or more estimated optimized behaviors 324, which may allow driving actions to be taken based on estimated optimized behaviors 324 instead of actual behaviors. An optimized driving action of a vehicle may refer to an optimized navigation of the vehicle approaching the traffic intersection. An optimized driving action of a vehicle may include a particular route for the vehicle to take when approaching the traffic intersection. An optimized driving action of a vehicle may include one or more particular movements to be performed by the vehicle and/or the driver of the vehicle approaching the traffic intersection. An optimized driving action of a vehicle may characterize how the vehicle may be moved when approaching the traffic intersection. For example, an optimized driving action of a vehicle may characterize in what directions(s) and what speed(s) the vehicle is optimized to be moved when the vehicle is driving toward the traffic intersection. The optimized driving action of the vehicle may include one or more changes in speed and/or direction in which the vehicle is moving. For instance, the optimized driving action may slow down the speed of the vehicle approaching the traffic intersection based on the sensor data 320 and the integrated data 344.

In some embodiments, integrated data 344 to determine the optimized navigations(s) of a vehicle may allow the navigation engine 306 to determine the optimized driving action based on environmental sensor data provided by multiple environmental sensors. For example, the integrated data 344 used by the navigation engine 306 to determine an optimized driving action of a vehicle may include environmental sensor data generated based on multiple fixed environmental sensors mounted above and close to the center of a traffic intersection. In some embodiments, the navigation engine 306 may determine the optimized driving action based on the values of the one or more parameters of objects, the sensor data 320 in the autonomous vehicle sensor processing system 106, and/or the integration of environmental sensor data and the autonomous vehicle sensor data 320.

In some embodiments, the navigation engine 306 of a vehicle may require fewer computational operations when an optimized driving action was determined based on the integrated data 344. The values of the one or more parameters of the object may shorten the time of processing vehicle sensor data 320 by the integration engine 304. For example, environmental sensor data 342 generated based on a fixed environmental sensor may be integrated into values of one or more parameters of an object with respect to a vehicle approaching to a traffic intersection. The values of the one or more parameters of the object (i.e. integrated data 344) transmitted into the vehicle may shorten the time of processing the vehicle sensor data 320 generated based on the sensors of the vehicle. Thus, the navigation engine 306 may require fewer computational operations in the autonomous vehicle sensor data processing system 300.

In some embodiments, the instruction engine 308 may be configured to provide one or more instructions to the vehicle based on estimated an optimized behavior 324 and/or other sensor data. The instruction(s) may characterize one or more maneuvers (e.g. operations, movements) to be performed by the vehicle to execute the optimized driving action. A maneuver may refer to a particular movement and/or particular operation of a vehicle. The performance of the maneuver(s) by the vehicle may include a driver of the vehicle performing one or more of the maneuvers and/or the vehicle performing the maneuvers on its own based on the instruction(s). An instruction may refer to information that provides details relating to an estimated optimized behavior 324. In some embodiments, an instruction may describe one or more maneuvers to be performed by the driver of the vehicle to execute an optimized driving action. An instruction may also identify an optimized driving action and/or may provide information on how the optimized driving action is to be performed. Such instruction may be provided to the driver visually (e.g. display), verbally (e.g. through a speaker), and/or through other communications medium.

FIG. 4 is a diagram illustrating an example of an environmental safety system 100 in accordance with some embodiments. The environmental safety system 100 may include one or more processors 402 and a memory 404. The processor(s) 402 may be configured to perform various operations by interpreting machine-readable execution instructions stored in the memory 404. For example, the system 100 may include one or more datastores stored in the memory 404 that are accessible to the system. In some embodiments, the datastore(s) may include various database, application/data packages, and/or other data that are available for download, installation, and/or execution. The environmental safety system 100 may include one or more fixed environmental sensors mounted above and close to the center of traffic intersections. In some embodiments, the environmental safety system 100 at traffic intersections may include sensors of the same type and/or different types. The environmental sensors may include Lidar sensors 406, radar sensors 408, imaging devices (e.g. cameras) 410, and ultrasonic sensors 412. Other types of sensors are contemplated. For example, environmental sensor data may be generated by a fixed environmental sensor mounted above and close to the center of a traffic intersection, such as a Lidar sensor 406, that determines locations and/or movements of an object nearby the traffic intersection. In some embodiments, a set of environmental sensor data may be obtained from one or more environmental sensors. A set of environmental sensor data may include one or more environmental sensor data generated by one or more environmental sensors. For instance, a set of environmental sensor data may be generated by multiple environmental sensors mounted above and the center of a traffic intersection, such as Lidar sensor 406 and imagining device (e.g. cameras) 410.

Figure 5A:
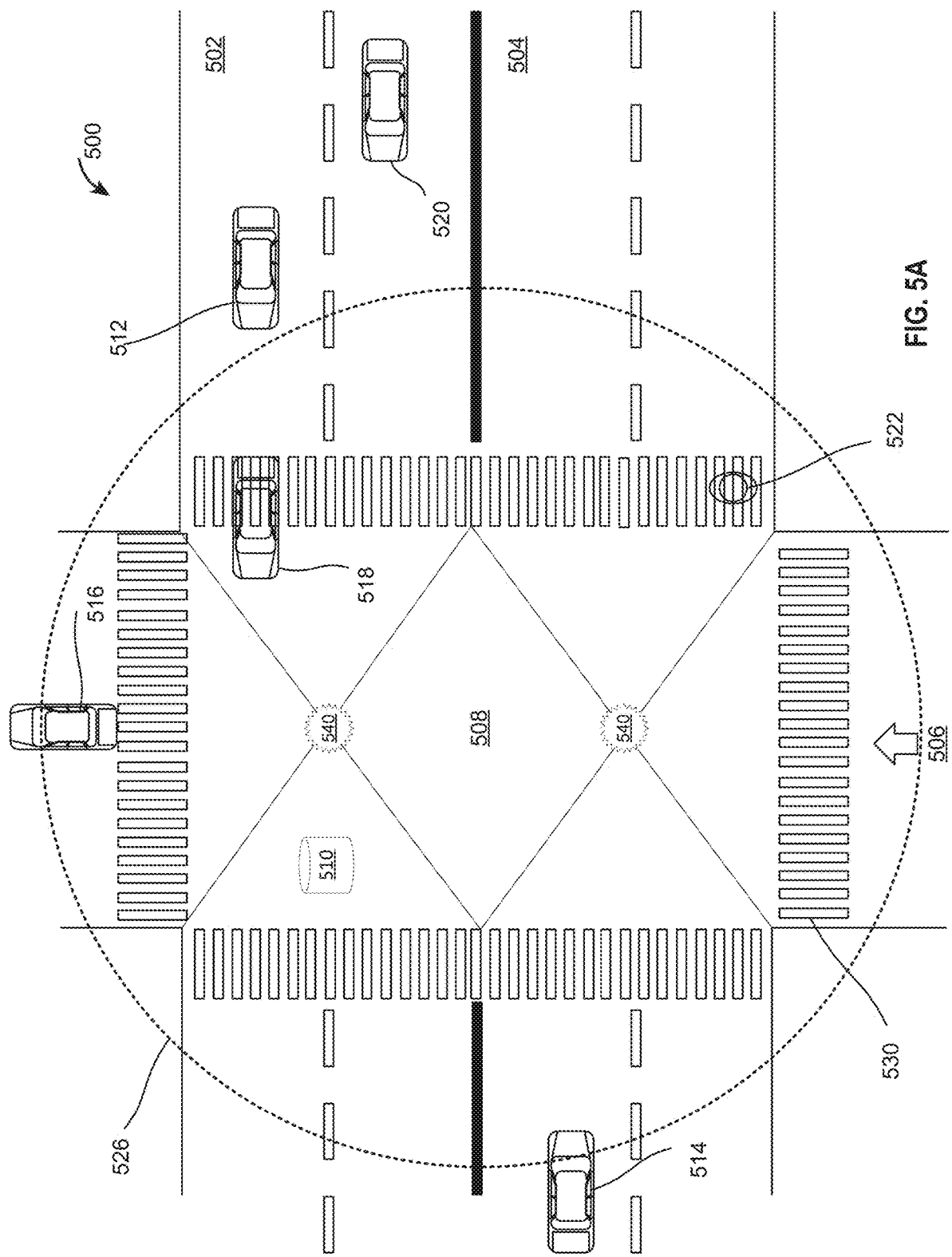
FIG. 5A illustrates an example scenario for providing driving actions to a vehicle based on sensor data provided by the environmental safety system, in accordance with some embodiments.

FIG. 5A illustrates an example scenario 500 for providing vehicle navigation using an environmental safety system, in accordance with some embodiments. The scenario 500 may include an environment including roads 502, 504, 506. The roads 502, 504 may individually include two lanes. The traffic on the roads 502, 504 may be traveling opposite of each other. The road 506 may include a one-way road. The roads 502, 504 and the road 506 may intersect at an traffic intersection 508. Vehicles 512, 518, 520 may be on the right lane and left lane of the road 502 approaching the traffic intersection 508. A vehicle 514 may be driving on the left lane of the road 504 ready to turn left to the road 506. A vehicle 516 may be on the lane of the road 506. One or more fixed environmental sensor 540 may be mounted above and close to the center of the traffic intersection 508. The fixed environmental sensors 540 may have different predetermined orientations. In some embodiments, the fixed environmental sensors 540 with different predetermined orientations may be located within a physical housing above and close to the center of the traffic intersection 508. In some embodiments, the fixed environmental sensors 540 may be located at segments of the traffic intersection 508. The fixed environmental sensor 540 located at different segments may have different predetermined orientations at the traffic intersection 508. A pedestrian 522 may be walking on a pedestrian crossing 530. The vehicles 512, 514, 516, 518, 520 may be carrying one or more sensors. The sensors of the vehicles 512, 514, 516, 518, 520 and the fixed environmental sensor 540 may be of the same type and/or different types. The capabilities of two or more of the sensors of the vehicle 512, 514, 516, 518, 520 and the fixed environmental sensor 540 may be the same and/or different.

Different environmental sensor data may be generated based on sensors of the fixed environmental sensor 540 or the vehicles 512, 514, 516, 518, 520. Different sensor data may characterize positions of objects within the environment of the different sensors. Different sensor data may be generated based on the sensors of different types, the sensors having different capabilities, the different positioning of the sensors within the environment, and/or other sensor data. Different sensor data generated based on the sensors of the fixed environmental sensor 540 and/or the vehicles 512, 514, 516, 518, 520 may be gathered together.

Integrated data for an optimized navigation of a vehicle 512 may be determined based on the gathered sensor data of the fixed environmental sensor 540 and the position of the vehicle 512. For example, the fixed environmental sensor 540 may detect the objects such as a vehicle 514, a pedestrian 522, and a statute 510 within a threshold distance of the traffic intersection 508. The fixed environmental sensor 540 may determine the value of the one or more parameters of the objects with respect to the fixed environmental sensor 540, with respect to the traffic intersection 508, and the vehicle 512. The movement of the vehicle 512, 514 may also be taken into account when determining the integrated data. The integrated data for the vehicle 512 may characterize positions of objects nearby traffic intersections 508. The optimized navigation of the vehicle 512 may be determined based on the integrated data, and one or more instructions may be provided to the vehicle 512 based on the optimized navigation of the vehicle 512. For example, the fixed environmental sensor 540 may detect the action of a vehicle 514 on the road 504 ready to turn left to the road 506. The vehicle 512 may, based on such data provided by the fixed environmental sensor 540, adjust the speed of the vehicle 512 when approaching the traffic intersection 508.

Figure 5B:
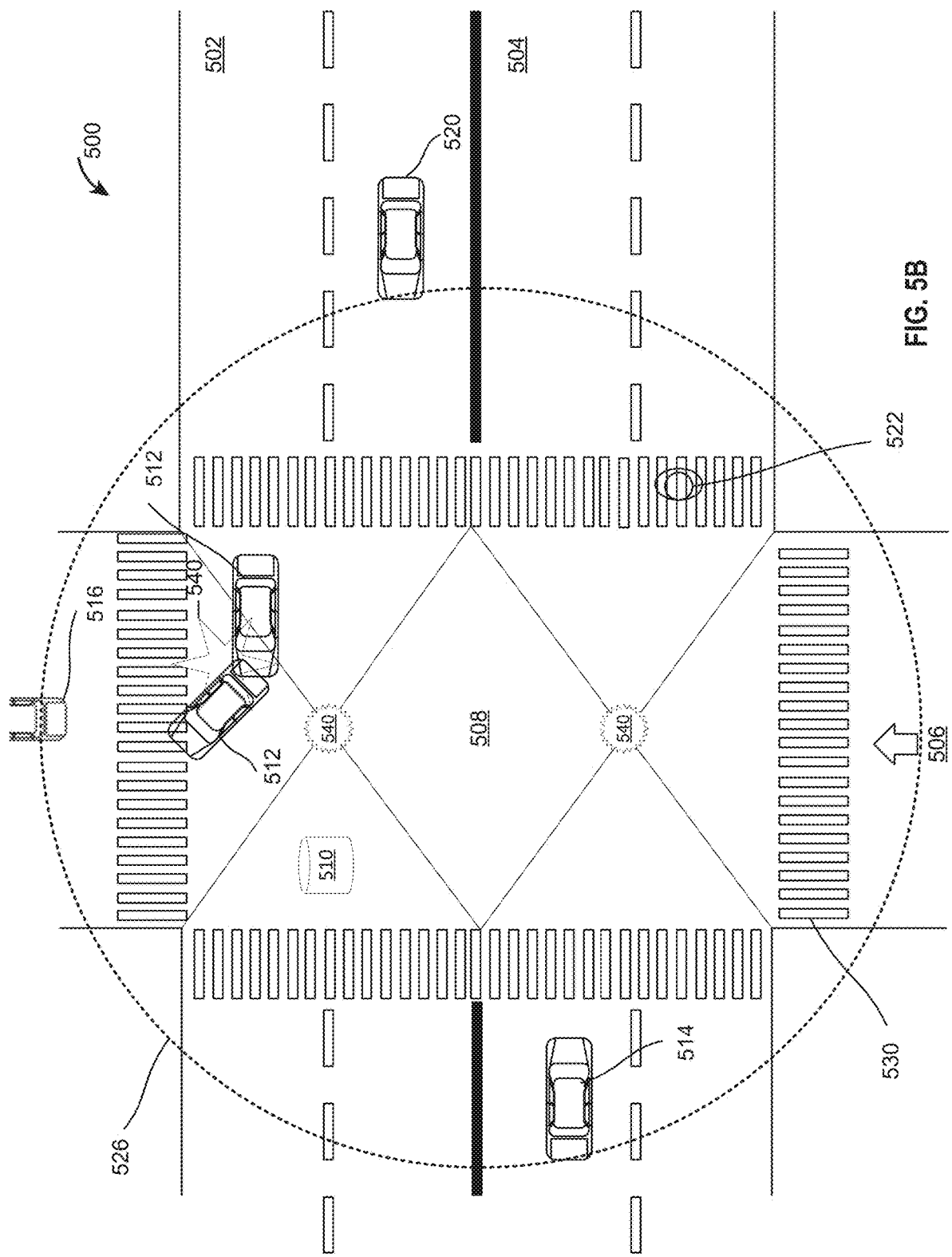
FIG. 5B illustrates an example scenario for providing driving actions to a vehicle based on sensor data provided by the environmental safety system, in accordance with some embodiments.

FIG. 5A and FIG. 5B are an example scenario illustrating an environmental safety system sharing the data collected at the traffic intersections 508 at a plurality of time points, in accordance with some embodiments. FIG. 5A illustrates an example scenario using the fixed environmental sensor 540 at a first time point of the plurality of time points. FIG. 5B illustrates an example scenario using the fixed environmental sensor 540 at a last time point of the plurality of time points. The fixed environmental sensor 540 may collect historic sensor data of one or more objects (e.g. pedestrians, a vehicle, a statute, a building, an obstacle) within a threshold distance of the traffic intersection 508. The historic sensor data may refer to environmental sensor data captured at a different time points by the fixed environmental sensor 540. For example, as shown in FIG. 5A, the fixed environmental sensor 540 may detect a driving vehicle 518 and a statute 510 within a threshold distance of the traffic intersection 508 at a first time point. The fixed environmental sensor 540 may also detect a car accident of the vehicle 518 and the vehicle 512 at the traffic intersection at a last time point, as shown in FIG. 5B. In some embodiments, the fixed environmental sensors 540 may record data at a different time points, including the first time point to the last time points, and report the data statistic to authorized data receivers, including vehicles. In some embodiments, the environmental safety system may broadcast information objects at the different time points to authorized data receivers. In some embodiments, the objects within a threshold distance of the traffic intersection 508 may be static based on the environmental sensor data being the same based on the environmental sensor data being the same captured at the first time point and the last time point. For example, the statute 510 may be static at the first time point and the last time point, as shown in FIG. 5A and FIG. 5B respectively.

As shown in FIG. 5A and FIG. 5B, the environmental sensor 540 may transmit an information object based on a request related to safety information from a data receiver. The information object may refer to traffic conditions on a traffic intersection 508 in a specific period of time from a first time point to a last time point. The request may refer to safety information and/or traffic information. The data receiver may refer to vehicles, governmental authorities, or remote devices. For example, the environmental sensors 540 may receive the request about the traffic information of the traffic intersection 508 from vehicles passing through the traffic intersection every day. The environmental sensors 540 may collect the data at different time points and determine values of one or more parameters of objects at the traffic intersection 508, and transmit the information object to the vehicle that has requested the information of the traffic intersection 508. For example, a vehicle 520 may receive the safety information about the static object 510 located at the traffic intersection 508 when approaching the traffic intersection 508. The safety information may be generated based on the environmental sensors 540 at the first time point and the last time point, FIG. 5 and FIG. 6 respectively. In some embodiments, the environmental sensors 540 may update a usage record of an account associates with the vehicle. In some embodiments, the environmental sensor 540 may generate a report of the usage record of the request from the vehicle.

Figure 6:
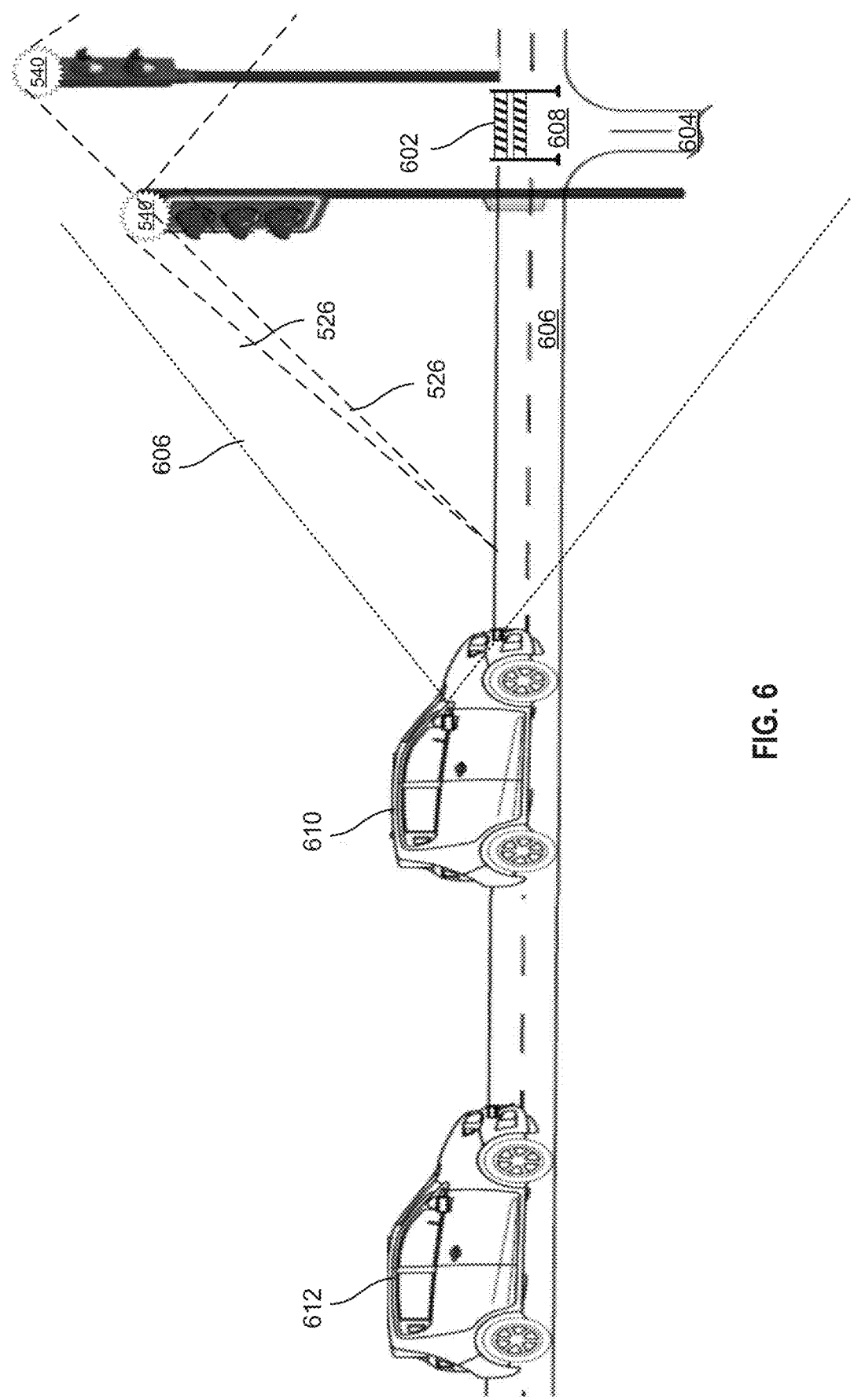
FIG. 6 illustrates an example scenario for providing driving actions to a vehicle based on sensor data provided by the environmental safety system and the vehicle, in accordance with some embodiments

In some embodiments, the request from a vehicle may comprise a position of the vehicle and the direction of the vehicle. The environmental sensor 540 may determine values of one or more parameters of the vehicle using the environmental sensor data, the position of the vehicle, and the direction of the vehicle. For example, the environmental sensor 540 may detect an accident 540 at a last time point as shown in FIG. 6. The environmental sensors 540 may also receive the request from the vehicle 514 520, and also receive the direction of the vehicle 514, 520 (i.e. the vehicle is driving straight on the road 504). The environmental sensor data may determine that the information object of the car accident 540 may not affect the driving action of the vehicle 514, but may affect the driving action of the vehicle 520. Therefore, the environmental sensors 540 may share the safety information to the vehicle 520.

In some embodiments, the environmental sensors 540 may receive a request for safety information after an occurrence of a traffic accident 540 at a traffic intersection 508. As shown in FIG. 5B, the request for the safety information may be sent from a vehicle approaching the traffic intersection, or sent from a transportation authority. For example, at a first time point as shown in FIG. 5A, the request was not received from the transportation authority because there was no incident within a threshold distance of the traffic intersection 508. But at the next time point as shown in FIG. 5B, the environmental sensors 540 may detect the accident 540 at the traffic intersection 508, and a request for safety information from the transportation authority may be sent to the environmental safety system. Therefore, the environmental safety system may report the accident status of the traffic intersection 508 to the transportation by sharing the data collected from the environmental sensor 540.

FIG. 6 is an example scenario illustrating an environmental safety system 100 for collecting and sharing data collected from streets and vehicle sensors, in accordance with some embodiments. In some embodiments, the environmental safety system may be a hub to collect data generated based on environmental sensors 540 and vehicle sensors 606. The environmental safety system may be a hub for collecting and redirect the data, and a center for sharing the information object based on the redirected data. For example, the environmental sensors 540 may detect road block 602 on a traffic intersection 608. The vehicles 610, 612 may send a request to the environmental safety system 100 such that the information object (i.e. the values of the one or more parameters of the object) may transmit the safety information to the vehicles 610, 612 approaching the traffic intersection 608. The sensor 606 from the vehicle 610 may further detect the road block 602 at the traffic intersection 608. The vehicle sensor data may determine values of the one or more parameters of the road block 602 (e.g. the distance between the road block 602 and the vehicle 610) and fused to the environmental safety system 100. The environmental safety system 100 may redirect the data based on the fused vehicle sensor data and the environmental sensor data, and transmit the information object based on the redirected data to the vehicle 612. For instance, the environmental safety system may transmit the information object at the traffic intersection 608 with respect to the vehicle 612 (e.g. the absolute distance between the road block 602 and the vehicle 612) that may not be able to detect the road block 602 in the front.

Figure 7:
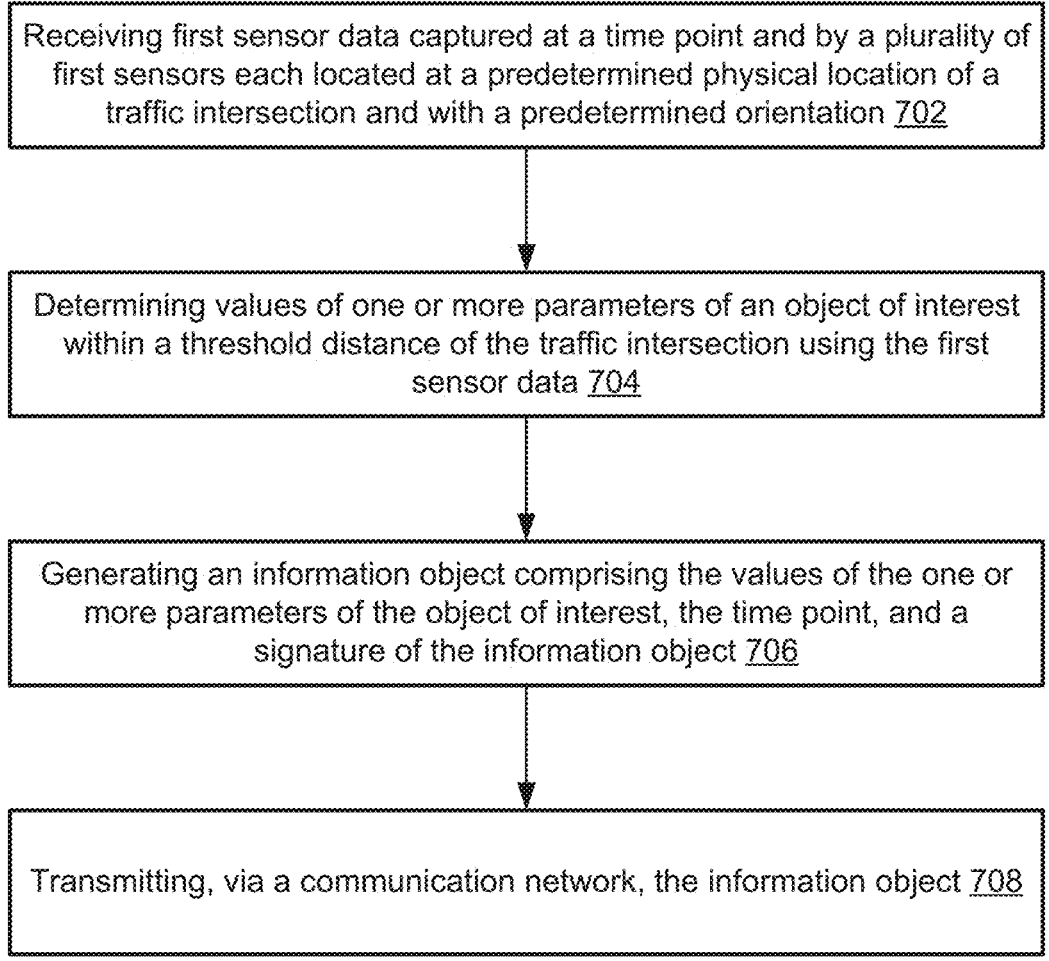
FIG. 7 illustrates a flowchart of an example method, in accordance with some embodiments.

FIG. 7 illustrates a flowchart of an example method for an environmental safety system sharing data collected from streets, in accordance with some embodiments. In this and other flowcharts, the flowchart illustrates by way of examples a sequence of steps. It should be understood the example method may include additional, fewer, or alternative steps performed in various orders or in parallel. The example method 700 may be implemented in various computing systems or devices including one or more processors. In step 702, an environmental safety system may receive first sensor data captured at a time point and by a plurality of first sensors. The environmental safety system may be located at a predetermined physical location of a traffic intersection and with a predetermined orientation. In step 704, the environmental safety system may determine values of one or more parameters of an object of interest within a threshold distance of the traffic intersection using the first sensor data. In step 706, the environmental safety system may generate an information object comprising the values of the one or more parameters of the object of interest, the time point, and a signature of the information object. In step 708, the environmental safety system may transmit, via a communication network, the information object.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
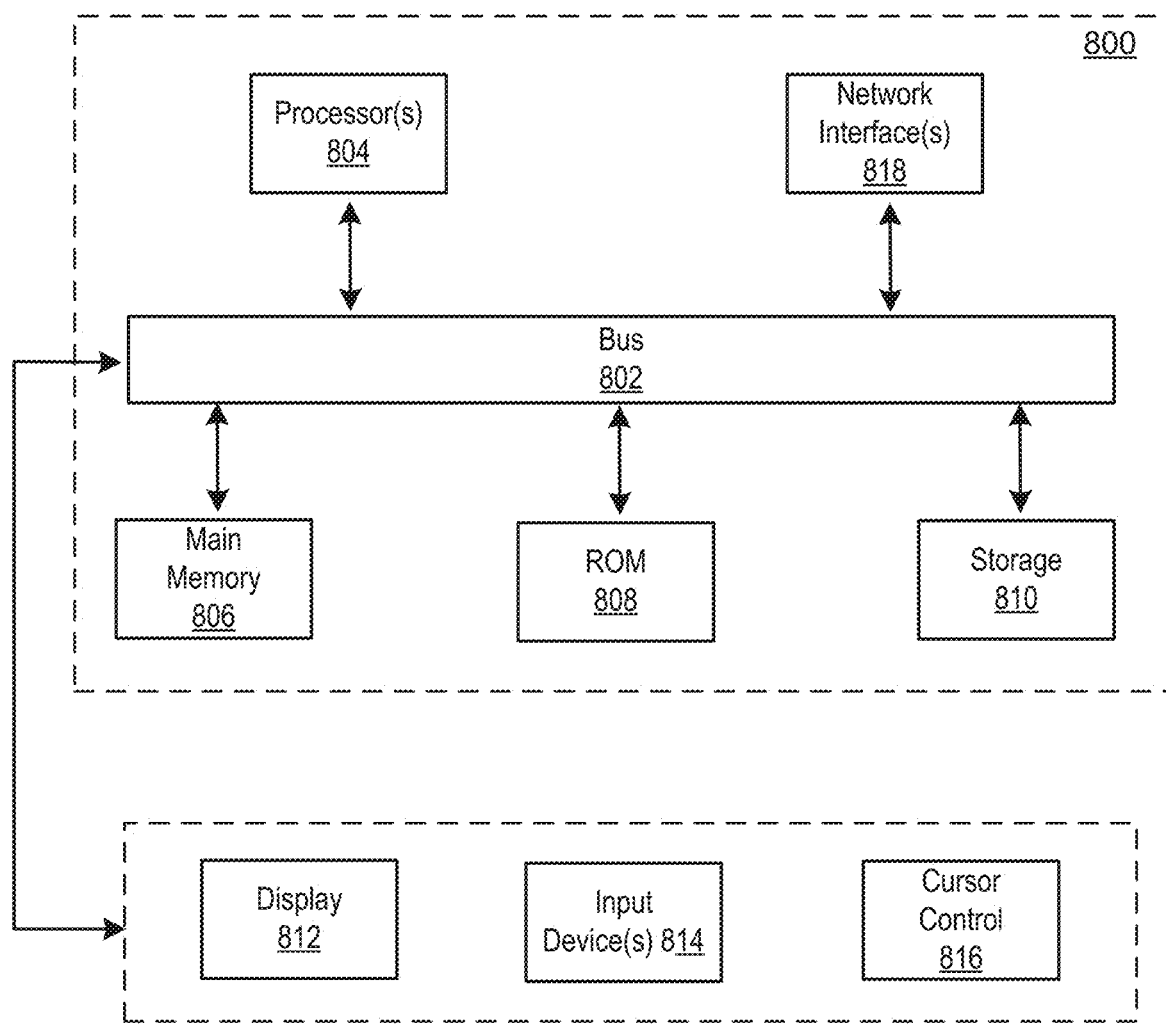
FIG. 8 is a diagram of an example computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 906 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An environmental safety system comprising:
    first sensors separated from a vehicle, each located at a predetermined physical location of a traffic intersection and with a predetermined orientation;
    a memory storing executable instructions;
    one or more processors in communication with the first sensors and the memory, the one or more processors programmed by the executable instructions to perform:
    receiving first sensor data captured at a time point and by the first sensors;
    determining a first object within a threshold distance of the traffic intersection using the first sensor data;
    determining first information of the first object, wherein the first object is non-vehicular, and wherein the first information comprises an event associated with the first object and a degree of severity associated with the event;
    receiving, from a first vehicle and a second vehicle, via a communication network, respective requests for safety information related to the traffic intersection;
    receiving, from the first vehicle, a first position and a first direction in which the first vehicle is heading;
    receiving, from the second vehicle, a second position and a second direction in which the second vehicle is heading;
    determining that the first object is within a threshold distance of the first direction of the first vehicle, the first object is at least partially detectable by the first vehicle, and the first object is occluded from view at the second position of the second vehicle;
    transmitting the first information and the second information to the first vehicle;
    receiving, while the first object is stationary, a first update to the first information, wherein the first update comprises additional information or an adjustment of existing information;
    redetermining the first information based on the first update, and based on the second position of the second vehicle, or integrating the first information with the first update;
    transmitting the redetermined first information or the integrated first information to the second vehicle;
    receiving a request from a third vehicle;
    determining that a driving action of the third vehicle is unaffected by the redetermined first information or the integrated first information; and
    in response to determining that the driving action of the third vehicle is unaffected by the redetermined first information or the integrated first information, and based on a direction of travel of the third vehicle, refraining from transmitting the redetermined first information or the integrated first information to the third vehicle.

2. The system of claim 1, wherein the request for the safety information is received after an occurrence of a traffic accident at the traffic intersection.

3. The system of claim 2, wherein the request for the safety information is received from a vehicle approaching the traffic intersection.

4. The system of claim 3, wherein the one or more processors is configured to perform:
    receiving second sensor data captured by second sensors mounted on the vehicle; and
    determining a driving action of the vehicle using the first information of the first object, the time point, and the second sensor data.

5. The system of claim 2, wherein the receiving a request for safety information comprises receiving first sensor data captured at a plurality of time points and by the first sensors, and wherein said determining the first information comprises determining values of one or more parameters of the first object at each of the plurality of time points using the first sensor data.

6. The system of claim 5, wherein the transmitting the first information to the first vehicle comprises transmitting, via the communication network, the first information comprising the values of the one or more parameters of the first object for a latest time point that has been determined.

7. The system of claim 5, wherein the receiving a request for safety information related to the traffic intersection comprises receiving a plurality of requests for safety information related to the traffic intersection, wherein each of the plurality of requests comprises a request time point, and wherein said transmitting the redetermined first information or the integrated first information comprises transmitting, via the communication network, the redetermined first information or the integrated first information that comprises a time point that matches or is within a threshold time period of, the requested time point.

8. The system of claim 1, wherein the transmitting the redetermined or the integrated first information comprises:
    broadcasting, via the communication network, the first information.

9. The system of claim 1,
    wherein at least one sensor of the first sensors is mounted above and close to the center of the traffic intersection,
    wherein sensors of the first sensors with different predetermined orientations are mounted above and close to the center of the traffic intersection, wherein the sensors of the first sensors with different predetermined orientations mounted above and close to the center of the traffic intersection is within a physical housing, and/or wherein the sensors of the first sensors are located at segments of the traffic intersection, and wherein the sensors at different segments of the traffic intersection have different predetermined orientations.

10. The system of claim 4,
wherein the first object is not within the line of sight of a sensor of the second sensors mounted on the vehicle,
wherein the second sensor data lacks sensor data related to the first object, and/or
wherein a first sensor of the first sensors and a second sensor of the second sensors have different fields of view.

11. The system of claim 4,
wherein the driving action determined is different from a driving action of the vehicle determined using the second sensor data, and/or
wherein determining the driving action requires fewer computational operations than determining a driving action of the vehicle using the second sensor data.

12. The system of claim 1, wherein the first information of the first object comprises an identity of the first object, a size of the first object, a position of the first object, a path of the first object, and a speed of the first object.

13. The system of claim 1, wherein the first information of the first object comprises the position of the first object with respect to the traffic intersection, with respect to an absolute reference frame, or with respect to the vehicle.

14. A method for street safety comprising:
under control of a processor:
receiving first sensor data captured at a time point and by first sensors, each located at a predetermined physical location of a traffic intersection and with a predetermined orientation;
determining a first object within a threshold distance of the traffic intersection using the first sensor data, wherein the first object is non-vehicular, and wherein the first information comprises an event associated with the first object and a degree of severity associated with the event;
determining first information the first object, wherein the first information comprises an event associated with the first information and a degree of severity associated with the event;
receiving, from a first vehicle and a second vehicle, via a communication network, respective requests for safety information related to the traffic intersection;
receiving, from the first vehicle, a first position and a first direction in which the first vehicle is heading;
receiving, from the second vehicle, a second position and a second direction in which the second vehicle is heading;
determining that the first object is within a threshold distance of the first direction of the first vehicle and that the first object is at least partially detectable by the first vehicle, and the first object is occluded from view at the second position of the second vehicle;
transmitting the first information and the second information to the first vehicle;
receiving, while the first object is stationary, a first update to the first information, wherein the first update comprises additional information or an adjustment of existing information;
redetermining the first information based on the first update, and based on the second position of the second vehicle, or integrating the first information with the first update; and
transmitting the redetermined first information or the integrated first information to the second vehicle;
receiving a request from a third vehicle;
determining that a driving action of the third vehicle is unaffected by the redetermined first information or the integrated first information; and
in response to determining that the driving action of the third vehicle is unaffected by the redetermined first information or the integrated first information, and based on a direction of travel of the third vehicle, refraining from transmitting the redetermined first information or the integrated first information to the third vehicle.

15. A non-transitory computer readable medium comprising instructions that, when executed, cause one or more processors to perform:
receiving first sensor data captured at a time point and by the first sensors;
determining a first object within a threshold distance of the traffic intersection using the first sensor data;
determining first information of the first object, wherein the first object is non-vehicular, and wherein the first information comprises an event associated with the first object and a degree of severity associated with the event;
receiving, from a first vehicle and a second vehicle, via a communication network, respective requests for safety information related to the traffic intersection;
receiving, from the first vehicle, a first position and a first direction in which the first vehicle is heading;
receiving, from the second vehicle, a second position and a second direction in which the second vehicle is heading;
determining that the first object is within a threshold distance of the first direction of the first vehicle, the first object is at least partially detectable by the first vehicle, and the first object is occluded from view at the second position of the second vehicle;
transmitting the first information and the second information to the first vehicle;
receiving, while the first object is stationary, a first update to the first information, wherein the first update comprises additional information or an adjustment of existing information;
redetermining the first information based on the first update, and based on the second position of the second vehicle, or integrating the first information with the first update;
transmitting the redetermined first information or the integrated first information to the second vehicle;
receiving a request from a third vehicle;
determining that a driving action of the third vehicle is unaffected by the redetermined first information or the integrated first information; and
in response to determining that the driving action of the third vehicle is unaffected by the redetermined first information or the integrated first information, and based on a direction of travel of the third vehicle, refraining from transmitting the redetermined first information or the integrated first information to the third vehicle.

16. The system of claim 1, wherein the first information comprises values of one or more parameters of the first object, the time point, and a signature of the first information.

17. The system of claim 1, wherein a path from the first object to the first vehicle is collinear with a path from the first vehicle to the second vehicle, and the first vehicle is between the second vehicle and the first object.

18. The environmental safety system of claim 1, wherein the first object comprises a criminal act.

19. The environmental safety system of claim 1, wherein the one or more processors are programmed by the executable instructions to perform:
   prior to the redetermining of the first information based on the first update, or the integrating of the first information with the first update, processing the requests for the safety information; and
   following the redetermining of the first information, or the integrating of the first information, reprocessing the requests for the safety information within a shorter time duration compared to the processing of the requests for the safety information.

20. The environmental safety system of claim 1, wherein the object comprises one or more criminal acts.

* * * * *